Patented Feb. 15, 1927.

1,617,702

UNITED STATES PATENT OFFICE.

PIO CACCIA, OF NEW YORK, N. Y.

METHOD OF PREPARING CONCENTRATED VITAMINE B.

No Drawing. Original application filed August 7, 1925, Serial No. 48,865. Divided and this application filed September 25, 1925. Serial No. 58,607.

The object of my invention is the production of vitamine B in a concentrated state and as distinguished from the present methods, my product, when purified and crystallized, preserves its curative effect in the organism with more intensity than the commercial vitamines in a mixture of different products, either in dry form or in solution.

In carrying out my invention one pound of dry yeast is diluted with one gallon of water. The mixture is placed in a cool place and allowed to stand for several days, the same being stirred from time to time. I then filter the mixture numbering the filtrate "1" and the residue "2". The residue is then triturated in a mortar with sand and this mixture is diluted with a solution of 0.2% HCl and the ratio being one liter per 100 grs. of residue. This mixture is allowed to stand for two hours, stirring from time to time, after which it is brought slowly to the boiling point and filtered. The last-named filtrate is mixed with filtrate "1" and concentrated to form a sticky paste of moisture content. The vitamine B is then extracted from this hygroscopic paste product with warm absolute alcohol in continued extraction to make the alcoholic solution about 95%. Then I precipitate the vitamine B from this alcoholic extract by the addition of dried ethylene dichloride, which takes up some of the water of said alcoholic extract to make it about 97%–98% in strength; the vitamine B being insoluble in this latter strength will precipitate leaving all the impurities in the alcohol and ethylene dichloride solution. The above precipitate is now dissolved with a very small quantity of water, whereupon concentrated sulphuric acid is added, then warmed gently and allowed to stand for some time until the crystals are formed. Finally I filter, wash the crystals with dilute sulphuric acid and then with ether.

I claim:

A method of deriving concentrated vitamine B consisting in a continued extraction of a sticky paste, containing vitamine B, with absolute alcohol, thereby reducing the alcohol to approximately 95% by the moisture content of said paste, then precipitating the vitamine B by the addition of dried ethylene dichloride to the alcoholic solution, dissolving the precipitate in water and finally crystallizing in the presence of concentrated sulphuric acid.

PIO CACCIA.